(12) United States Patent
Kikuchi

(10) Patent No.: US 6,388,983 B1
(45) Date of Patent: May 14, 2002

(54) CLAMP MECHANISM FOR DISK DRIVE

(75) Inventor: Hideo Kikuchi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/415,820

(22) Filed: Oct. 12, 1999

(30) Foreign Application Priority Data

Oct. 12, 1998 (JP) .......................................... 10-289528

(51) Int. Cl.⁷ .......................................... G11B 17/028
(52) U.S. Cl. ........................................................ 369/270
(58) Field of Search ................................. 369/270, 271, 369/178, 191–192, 30.83, 30.85; 360/98.08, 99.05, 99.12, 98.04

(56) References Cited

U.S. PATENT DOCUMENTS

| | | | |
|---|---|---|---|
| 4,951,277 A | | 8/1990 | Masunaga et al. .......... 369/270 |
| 5,060,096 A | * | 10/1991 | Hirose et al. ............ 360/99.12 |
| 5,204,850 A | | 4/1993 | Obata ....................... 369/75.2 |
| 5,636,198 A | * | 6/1997 | Maeng ........................ 369/191 |
| 5,748,606 A | * | 5/1998 | Nakagawa et al. ......... 369/271 |
| 5,764,612 A | * | 6/1998 | Tanaka et al. ............. 369/75.2 |
| 5,825,746 A | * | 10/1998 | Lee ............................. 369/270 |
| 5,831,948 A | * | 11/1998 | Suzuki ........................ 369/36 |
| 5,970,044 A | * | 10/1999 | Kambayashi et al. ....... 369/271 |
| 6,097,693 A | * | 8/2000 | Nakamichi .................. 369/270 |
| 6,201,782 B1 | * | 3/2001 | Tanaka et al. .............. 369/270 |
| 6,233,218 B1 | * | 5/2001 | Hoffmann ................... 369/178 |

* cited by examiner

Primary Examiner—Brian E. Miller
(74) Attorney, Agent, or Firm—Brinks Hofer Gilson & Lione

(57) ABSTRACT

In the conventional clamp mechanism for a disk drive, since a clamper is attracted by a magnetic plate in a non-clamped state of the disk D, when the disk drive receives vibrations or shocks, the clamper is released from attraction by the magnetic plate to create displacement of the clamper. Since, in the clamp mechanism for a disk drive of the present invention, the holding arm lifts up the clamper and maintains a lifted-up state of the clamper in the non-clamped state of the disk D, the vibrations or shocks received by the disk drive will not cause displacement of the clamper.

6 Claims, 5 Drawing Sheets

CLAMP MECHANISM FOR DISK DRIVE

BACKGROUND OF THE INVENTION

1. Field of the Invention

The present invention relates to a clamp mechanism for a disk drive suitable for use in an optical disk drive and the like.

2. Description of the Prior Art

A clamp mechanism for a conventional disk drive will be explained with reference to FIG. 10 and FIG. 11. A support member 51 is comprised of a chassis 52 including a hole 52*a* on the center thereof and a bent part 52*b* with a section of L-letter shape, and a support plate 53 having a magnetic plate 63, fixed to the chassis 52 so as to cover an upper hole of the chassis 52.

And, between the chassis 52 and the support plate 53 is made up a housing space 54.

A clamper 55 is comprised of a clamping part 55*a* made of a synthetic resin being a non-magnetic material, a neck part 55*b* formed integrally with the clamping part 55*a*, which has a smaller diameter than the clamping part 55*a*, a flange part 55*c* affixed to the neck part 55*b*, and a magnet 56 placed inside thereof.

And, the neck part 55*b* is inserted through the hole 52*a* of the chassis 52, the flange part 55*c* is contained in the housing space 54, the clamping part 55*a* is suspended on the lower part of the chassis 52, and the flange part 55*c* is suspended on the upper part of the chassis 52; and the clamper 55 is made vertically movable to the chassis 52.

A cushioning member 57 is made of a ring rubber or the like, and the cushioning member 57 is attached on the support plate 53 inside the housing space 54.

And, the clamper 55 is placed on the upper part, since the magnet 56 is attracted by the magnetic plate 63. In this state, the flange part 55*c* is in contact with the cushioning member 57, which functions as a shock absorber when the clamper 55 moves upward.

A drive member 58 is comprised of a drive plate 59 of which one end is rotatably supported and the other end is made vertically movable, a vertically movable motor 60 fixed to the other end of the drive plate 59, and a turntable 61 set about a spindle 60*a* of the motor 60, which is vertically movable together with the motor 60.

And, the turntable 61 is provided with a magnetic plate 61*a* on the upper side thereof, and when the turntable 61 moves up, the magnet 56 of the clamper 55 makes a transition from attraction with the magnetic plate 63 on the support plate 53 to attraction with the magnetic plate 61*a*.

A mount member 62 is made of a metal plate having a hole 62*a*. The mount member 62 is placed between the clamper 55 and the turntable 61 to mount a disk D.

Next, the operation of the conventional clamp mechanism for a disk drive will be discussed. In the non-clamped state in FIG. 10, the clamper 55 is located on the upper part where the magnet 56 is attracted by the magnetic plate 63, and the turntable 61 is located on lower part.

First, in this state, the disk D is carried to the drive member 58 from a package or the like by a carrying member (not illustrated), and it is mounted on the mount member 62, as shown in FIG. 10.

Then, a drive motor (not illustrated) is driven to rotate the drive plate 59 so as to raise the other end upward.

And, as shown in FIG. 11, the turntable 61 moves upward with the disk D, and as the turntable 61 approaches the clamper 55, the clamper 55 is detached from attraction with the magnetic plate 63 into attraction with the magnetic plate 61*a* on the turntable 61. As a result, the disk D is clamped between the clamper 55 and the turntable 61.

Next, as the motor 60 is driven to rotate the spindle 60*a*, the disk D is turned through the turntable 61, thus performing reproduction or recording.

When dismounting the disk D to replace by another, first an eject button is pressed.

Then, the drive motor is driven to move the other end of the drive plate 59 downward, and accordingly the turntable 61 moves down together with the clamper 55.

And, the clamper 55 is suspended such that the flange part 55*c* is hung on the bent part 52*b* of the chassis 52. In this state, as the turntable 61 moves down further, the turntable 61 with the disk D goes down, and the attraction between the turntable 61 and the clamper 55 is released.

As the result, as shown in FIG. 10, the clamper 55 returns to the state of being attracted to the magnetic plate 63 by the magnet 56, and the turntable 61 is located downward to restore the initial state that the disk D is mounted on the mount member 62.

Then, the disk D is to be carried by the carrying member outside the drive member 58.

In the clamp mechanism for a conventional disk drive thus described, since the clamper 55 is attracted by the magnetic plate 63 in the non-clamped state of the disk D, if the disk drive receives vibrations and shocks, the clamper 55 will be released from attraction with the magnetic plate 63, thus creating displacement of the clamper 55, which is a problem to be resolved.

Further, the conventional clamp mechanism requires the support plate 53, magnetic plate 63, and cushioning member 57, etc., which increases not only the number of the components but also the production cost, and deteriorates the productivity.

SUMMARY OF THE INVENTION

As the first means to solve the aforementioned problems, the clamp mechanism for a disk drive of the present invention is configured with a turntable placed to be vertically movable, a clamper facing to the turntable, which is mounted on a support member such as a chassis so as to be movable in a direction of approaching and detaching from the turntable, and a holding arm that can be engaged with and released from the clamper, wherein the turntable and the clamper are made to be attracted to each other by a magnetic force, the holding arm releases the clamper from a lifted-up state when the turntable is lifted up, a disk is clamped between the turntable and the clamper by attraction of the turntable and the clamper by the magnetic force, the disk is released from being clamped when the turntable is lowered, and the holding arm lifts up the clamper to maintain the lifted-up state of the clamper.

As the second means to solve the problems, the clamp mechanism is configured such that the clamper is attached perforating through the support member, and is provided with a clamping part that underlies the support member and a flange part that overlies the support member, and the holding arm lifts up the flange part to press the flange part to the support member.

As the third means to solve the problems, the clamp mechanism is configured such that the holding arm is provided with a slant part that is slant upward against a face of the disk clamped, and the slant part is engaged with the flange part to lift up the clamper.

As the fourth means to solve the problems, the clamp mechanism is configured such that the holding arm is placed to be swingable in a transverse direction against a moving direction of the clamper.

As the fifth means to solve the problems, the clamp mechanism is configured with, in addition to the first means, a drive gear turned by a motor and a clamp lever turned by the drive gear which is associated with lifting movement of the turntable, wherein the clamp lever is formed integrally with the holding arm.

DETAILED DESCRIPTION OF THE PREFERRED EMBODIMENTS

Figure 1:
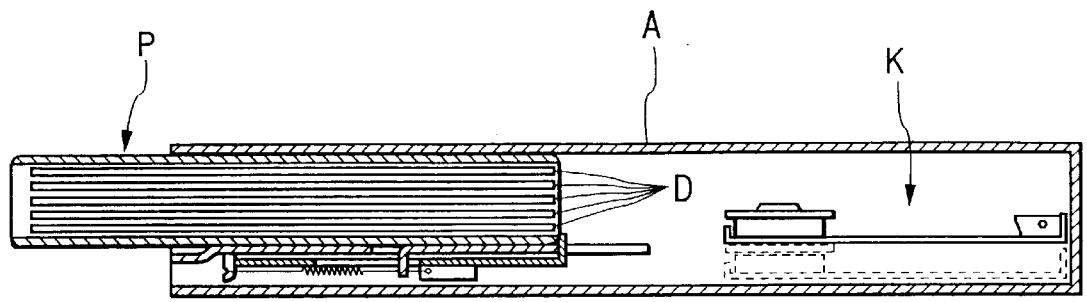
FIG. 1 is a drawing to explain the outline of a disk drive relating to the present invention.
Figure 2:
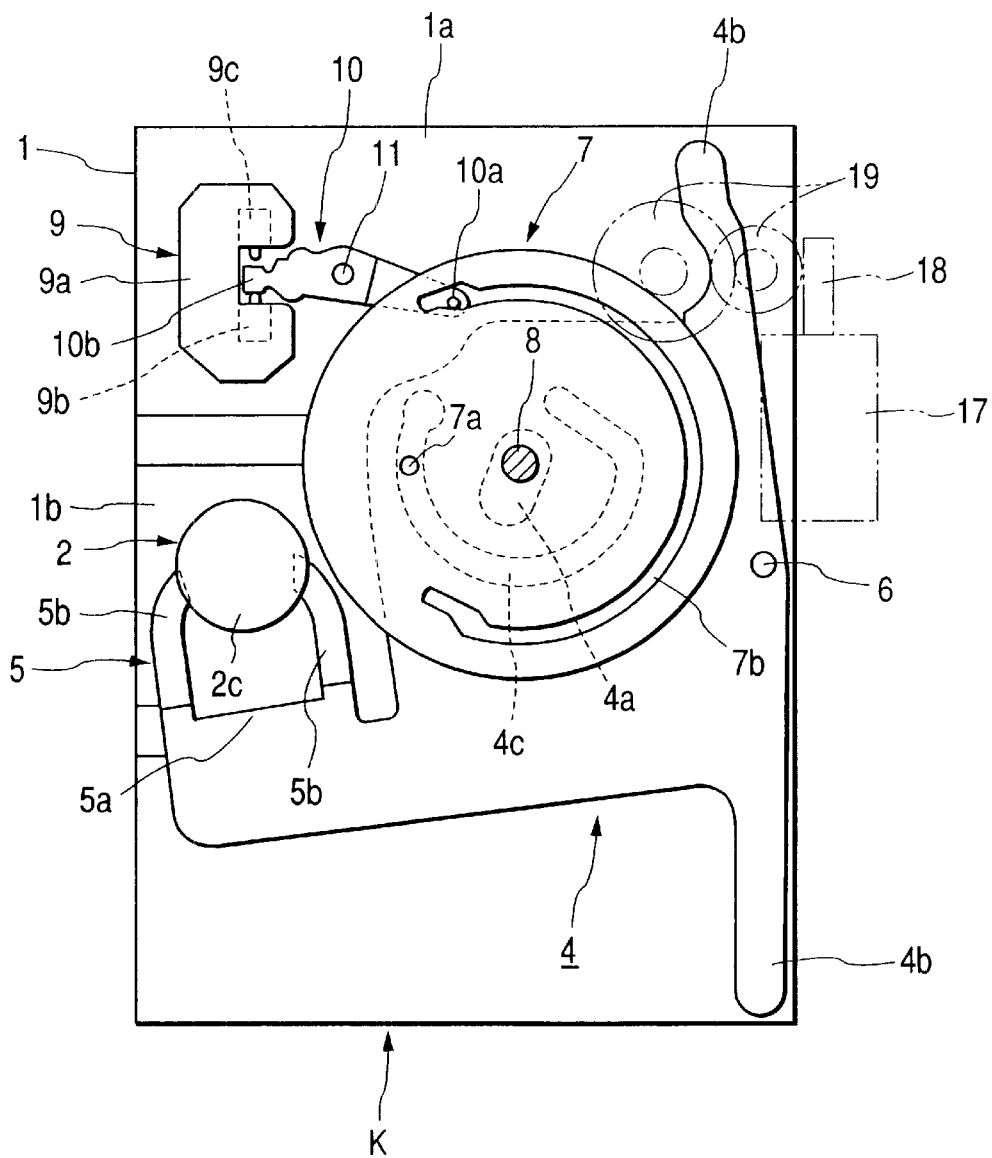
FIG. 2 is a plan view of the major part of the clamp mechanism for the disk drive relating to the present invention.
Figure 3:
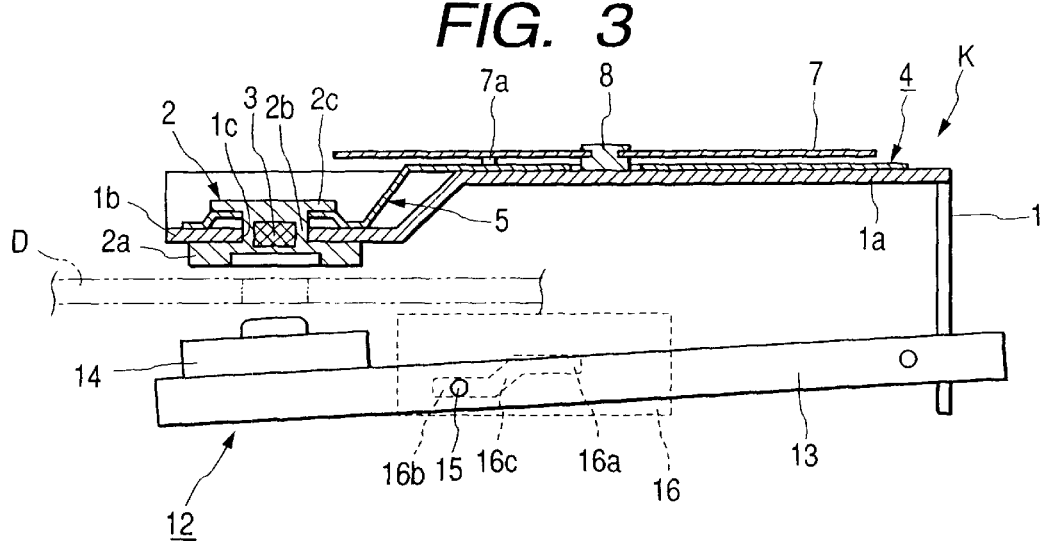
FIG. 3 is a vertical sectional view of the major part of the clamp mechanism for the disk drive relating to the present invention.
Figure 4:
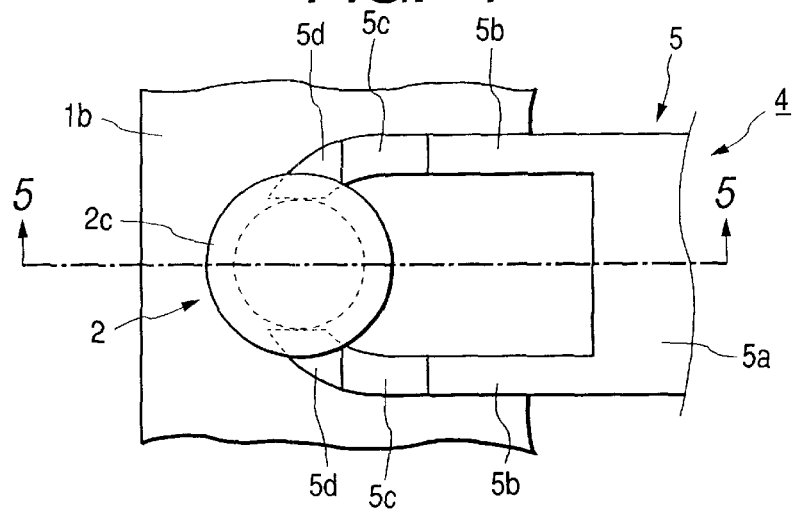
FIG. 4 is an enlarged plan view of the major part of the clamp mechanism for the disk drive relating to the present invention.
Figure 5:
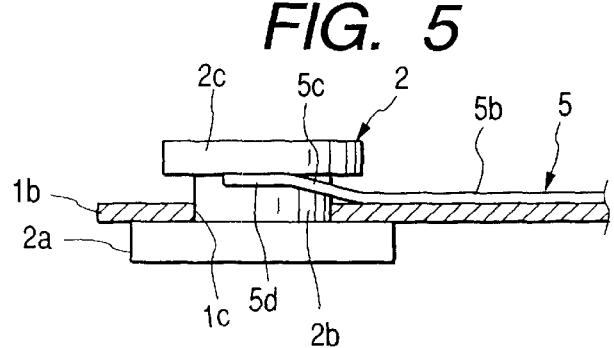
FIG. 5 is a sectional view taken on by the line 5—5 in FIG. 4.
Figure 6:
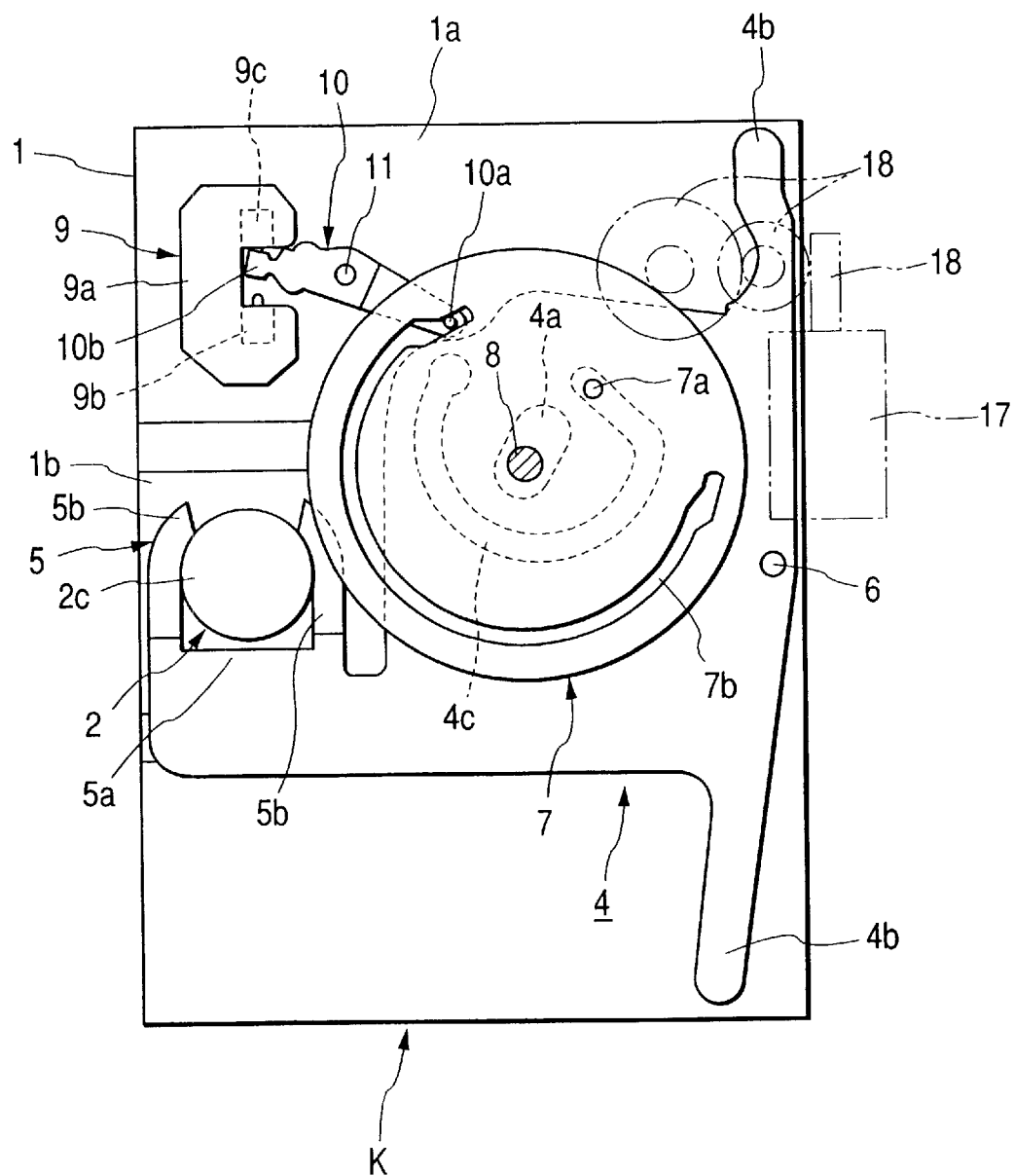
FIG. 6 is a plan view of the major part to explain the operation of the clamp mechanism for the disk drive relating to the present invention.
Figure 7:
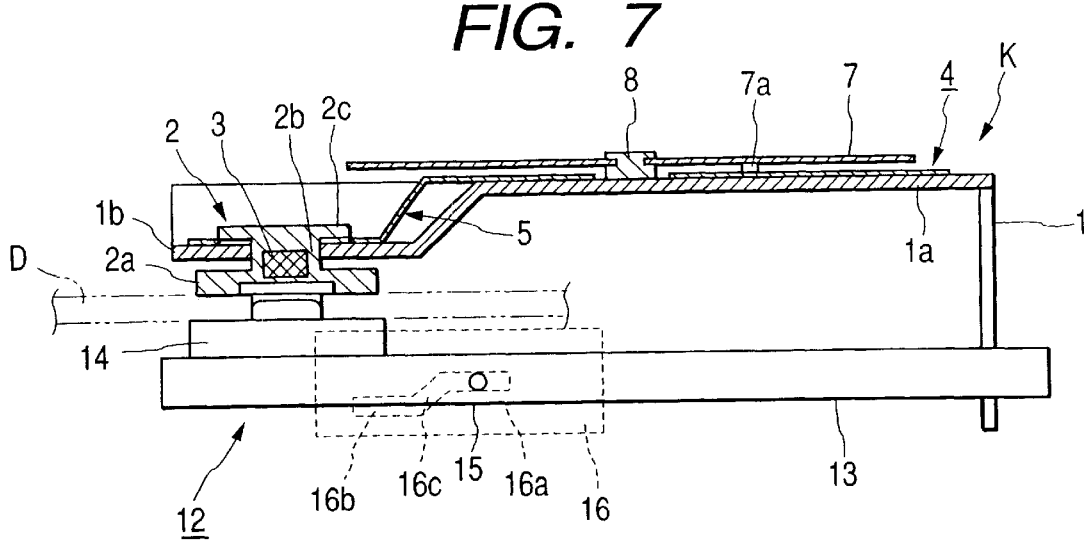
FIG. 7 is a vertical sectional view of the major part to explain the operation of the clamp mechanism for the disk drive relating to the present invention.
Figure 8:
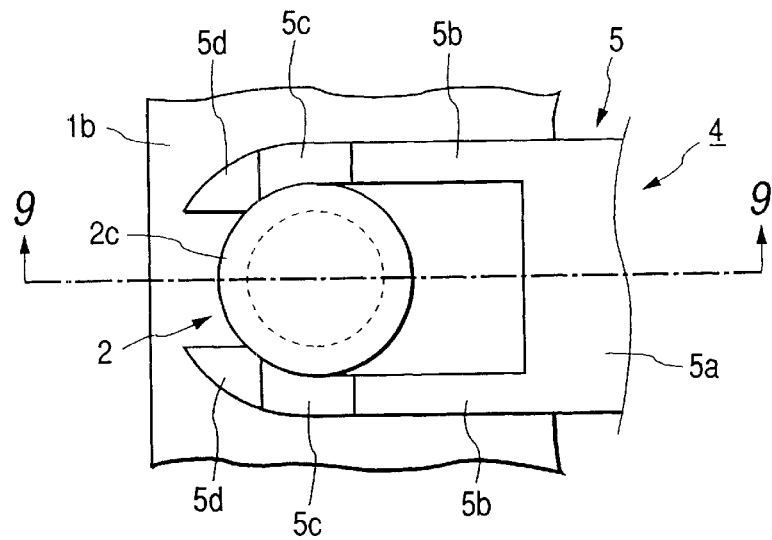
FIG. 8 is an enlarged plan view of the major part to explain the operation of the clamp mechanism for the disk drive relating to the present invention.
Figure 9:
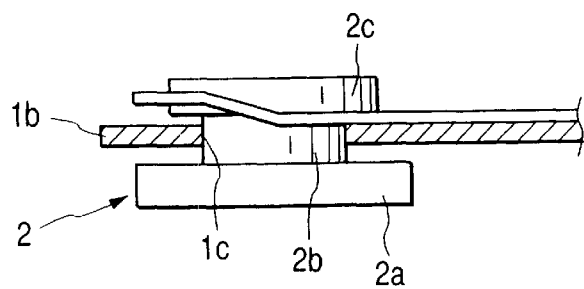
FIG. 9 is a sectional view taken on by the line 9—9 in FIG. 8.
Figure 10:
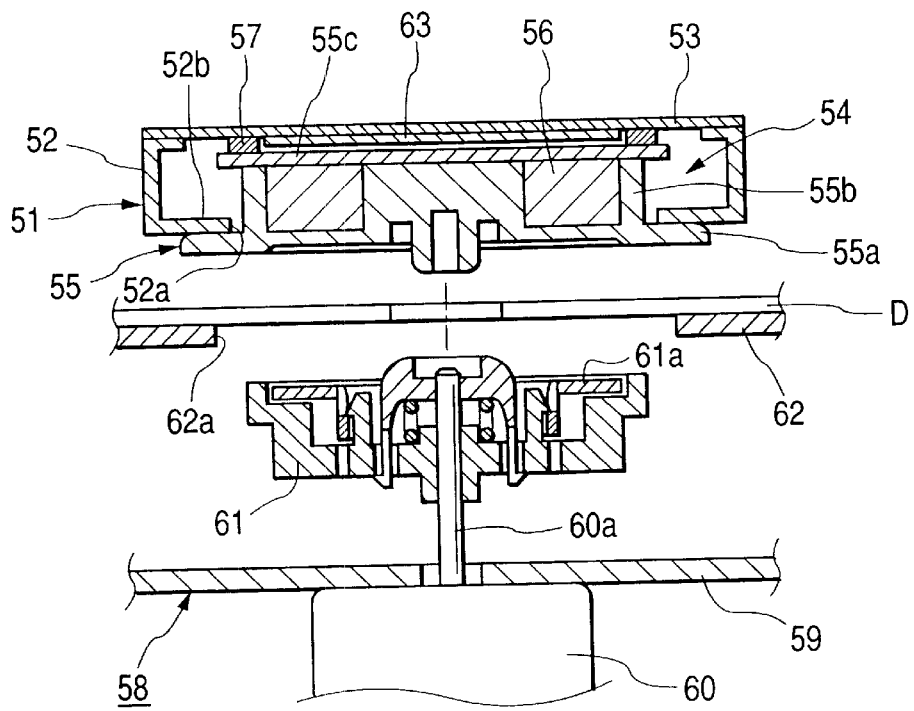
FIG. 10 is a sectional view of the major part of the clamp mechanism for the conventional disk drive.
Figure 11:
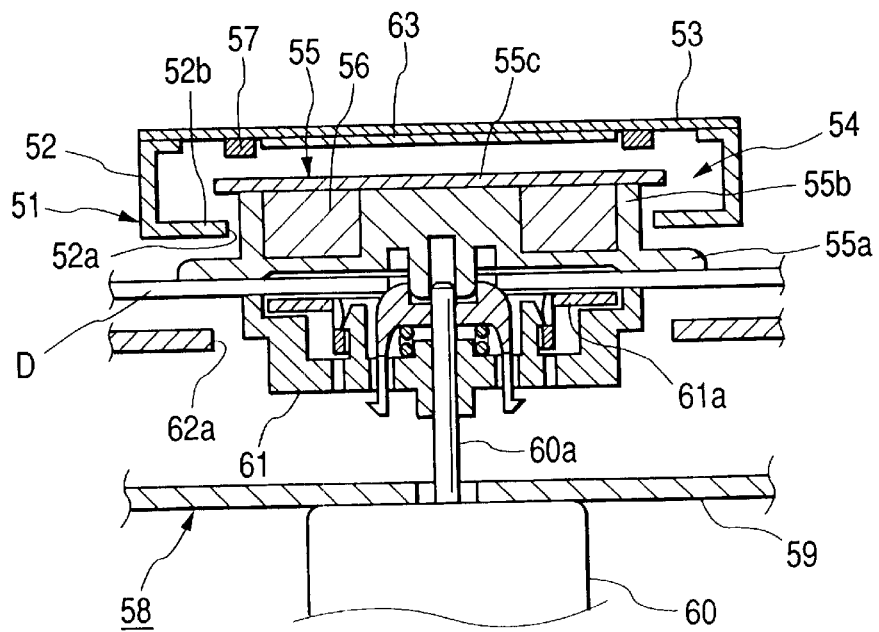
FIG. 11 is a sectional view of the major part to explain the operation of the clamp mechanism for the conventional disk drive.

A clamp mechanism for a disk drive of the present invention will now be described with reference to FIG. 1 through FIG. 9. FIG. 1 is a drawing to explain the outline of the disk drive of the present invention, and FIG. 2 through FIG. 9 illustrate the clamp mechanism for the disk drive of the present invention, in which FIG. 2 is a plan view of the major part, FIG. 3 is a vertical sectional view of the major part, FIG. 4 is an enlarged view of the major part, FIG. 5 is a sectional view taken on by the line 5—5 in FIG. 4, FIG. 6 is a plan view of the major part to explain the operation, FIG. 7 is a vertical sectional view of the major part to explain the operation, FIG. 8 is an enlarged plan view of the major part to explain the operation, and FIG. 9 is a sectional view taken on by the line 9—9 in FIG. 8.

Next, referring to FIG. 1, the outline of the disk drive of the present invention will be explained. A disk package P with a plurality of disks D (5 in this embodiment) contained is mounted on a box-shaped enclosure A, so that it can be inserted in and pulled out.

And, a disk drive mechanism K that carries and drives the disk D is installed in the enclosure A so as to be vertically, movable.

And, to operate a disk selection key (not illustrated) arranged on the front face will drive a motor (not illustrated). This motor moves the disk drive mechanism K up and down in the enclosure A, and halts the disk drive mechanism K at a specific position for a selected disk D.

Then, a carrying member (not illustrated) of the disk drive mechanism K is operated, and a specific disk D is carried from the disk package P toward the disk drive mechanism K to be clamped by the disk drive mechanism K.

And, the disk D is released from being held by the carrying member. And, pressing an operation button will rotate the disk D, thus performing reproduction, recording, and the like.

And then, operating the eject button or the disk selection key will restart the carrying member to hold the disk D. In this state, the disk D is released from the clamped state and returned to the disk package P by the carrying member.

Thus, the disk drive is operated.

Next, the clamp mechanism in the disk drive mechanism K will be discussed referring to FIG. 2 through FIG. 9. A support member 1 made up with a vertically movable chassis assumes a box-shape, which comprises an upper wall 1a, a step part 1b bent down, which is provided on the upper wall 1a, and a hole 1c provided on the step part 1b.

And, a clamper 2 is made up with a clamping part 2a molded of a synthetic resin being a non-magnetic material, a neck part 2b, a flange part 2c, and a magnet 3 embedded in the neck part 2b.

In this clamper 2, the neck part 2b is inserted through the hole 1c of the support member 1, the clamping part 2a underlies the support member 1, and the flange part 2c overlies the support member 1. Thus, the clamper 2 is mounted on the support member 1 to be vertically movable within a range that the clamping part 2a and the flange part 2c are in contact with and suspended by the support member 1.

A clamp lever 4 made of a metal plate includes a clearance hole 4a provided on the center thereof, a pair of arms 4b extending in the opposite direction each other, a cam groove 4c provided near the center thereof so as to surround the clearance hole 4a, and a U-letter shaped holding arm 5.

As shown in FIG. 3, FIG. 4, and FIG. 5, the holding arm 5 is comprised of a base part 5a connected to the clamp lever 4, a pair of arms 5b extending in parallel to each other from both ends of the base part 5a, which are bent downward, slant parts 5c extending slant upward, which are formed to connect with the arms 5b, and suspending parts 5d being free ends, which are formed to connect with both ends of the slant parts 5c.

Further, the clamp lever 4 thus constructed is mounted on the upper wall 1a of the support member 1, so that it is able to rotate about a spindle 6 fixed to the support member 1.

When this clamp lever 4 is mounted, the arms 5b of the holding arm 5 are disposed such that they can be engaged with and released from the clamper 2 set to the step part 1b of the support member 1.

That is, the holding arm 5 swings in the traverse direction to the moving direction of the clamper 2 as the clamp lever 4 swings. Thereby, as shown in FIG. 4 and FIG., 5, in the state that the suspending part 5d is located on the lower part of the flange part 2c, the holding arm 5 lifts up the clamper 2 to press the clamping part 2a onto the support member 1. And, as shown in FIG. 8 and FIG. 9, in the state that the suspending part 5d is released from the lower part of the flange part 2c, the clamper 2 is able to move freely inside the hole 1c.

A drive gear 7 possesses a pin 7a provided on the lower part near the center thereof and a cam groove 7b formed near the outer part thereof. Disposed to overlie the clamp lever 4, the drive gear 7 has the center part thereof set and supported by a spindle 8 fixed on the upper wall 1a, so that it can rotate.

Further, the spindle 8 is projected out through the clearance hole 4a of the clamp lever 4, and owing to the clearance hole 4a, the clamp lever 4 will not touch the spindle 8 when the clamp lever 4 swings. And, the pin 7a is inserted in the cam groove 4c, and accompanied with the rotation of the pin 7a, the cam groove 4c is moved. As the result, the clamp lever 4 will swing about the spindle 6, whereby the holding arm 5 will move in the transverse direction against the clamper 2.

A detection member 9 is comprised of a body 9a and a pair of switches 9b, 9c fixed to the body 9a. The detection member 9 is attached on the upper wall 1a by appropriate means.

A switch lever 10 made of a metal plate or the like has a pin 10a formed on one end and a manipulation piece 10b formed on the other end. The switch lever 10 has the center thereof attached by a spindle 11 that is fixed on the upper wall 1a, and thereby it is made rotatable about the spindle 11.

And, when the switch lever 10 is attached, the pin 10a is inserted in the cam groove 7b, and the manipulation piece 10b comes in a state to face the switches 9b, 9c. And, as the drive gear 7 turns, the pin 10a moves along the cam groove 7b. As the result, the switch lever 10 turns about the spindle 11, and accompanied with this movement, the manipulation piece 10b will operate the switches 9b, 9c.

A drive member 12 is comprised of a drive plate 13 whose one end is rotatably supported by the support member 1 and the other end is made vertically movable, a vertically movable turntable 14 mounted on the other end of the drive plate 13, and a pin 15 provided on the side wall of the drive plate 13.

And, the turntable 14 has the upper side made of a magnetic material, and is driven to rotate by a motor (not illustrated).

And, as shown in FIG. 7, when the turntable 14 goes up, the clamper 2 is attracted to the turntable 14 by the magnet 3, and the disk D is clamped between the turntable 14 and the clamper 2.

As shown in FIG. 3 and FIG. 7, a slide member 16 is provided on the side wall of the support member 1, which is able to slide in the cross direction.

The slide member 16 possesses an upper groove 16a formed on the upper part, a lower groove 16b formed on the lower part, and a slant groove 16c that connects the upper groove 16a and the lower groove 16b. The pin 15 of the drive member 13 is inserted in these grooves, and the pin 15 is able to move along these grooves.

Further, the slide member 16 has one end suspended by the arms 4b of the clamp lever 4, and slides in the cross direction with the swing of the clamp lever 4. In accordance with this movement, the pin 15 moves in the vertical direction, whereby the turntable 14 located on the one end of the drive member 12 can be moved up and down.

Further, a motor 17 is fixed to the support member 1, and between a worm gear 18 furnished with the motor 17 and the drive gear 7 is provided an intermediate gear 19, which transmits the rotation of the motor 17 to the drive gear 7.

Next, the operation of the clamp mechanism for a disk drive of the present invention will be discussed. As shown in FIG. 2 through FIG. 5, in the non-clamped state of the disk D, the holding arm 5 is engaged with the lower part of the flange part 2c of the clamper 2 to lift up the clamper 2, and the drive plate 13 and the turntable 14 are located at a lower position detached from the clamper 2. In addition, the detection member 9 has the switch 9b operated by the switch lever 10, which indicates a state that the non-clamped state is detected.

Next, in this state, the disk D held by the carrying member is carried between the clamper 2 and the turntable 14.

Then, the motor 17 is driven to rotate the drive gear 7 counterclockwise through the worm gear 18 and the intermediate gear 19, whereby the pin 7a turns the clamp lever 4 clockwise through the cam groove 4c, and the holding arm 5 moves in the direction to release the engagement with the clamper 2 and the pin 10a turns the switch lever 10 clockwise through the cam groove 7b.

On the other hand, the rotation of the clamp lever 4 slides the slide member 16 forward, effecting to lift the pin 15 upward along the slant groove 16c, and therefore the turntable 14 is moved up through the drive plate 13.

And, as the rotation of the motor 17 leads to the state shown in FIG. 6 through FIG. 9, the motor 17 stops the rotation; and in this state, the holding arm 5 is released from the engagement with the clamper 2 and the clamper 2 is set free. And, the pin 15 is engaged with the upper groove 16a to move the turntable upward.

When the turntable 14 is moved up to approach the clamper 2, the clamper 2 set free comes in a state of being attracted to the turntable 14 by the magnet 3, which in consequence leads to a state that the disk D is clamped between the clamper 2 and the turntable 14.

Further, the rotation of the cam groove 7b of the drive gear 7 turns the switch lever 10 through the pin 10a, and as the result, the switch 9c is operated to detect the clamped state of the disk D. This detection will release the disk D from being held by the carrying member.

Next, as the motor (not illustrated) is driven by pressing the operation button, the motor rotates the disk D on the turntable 14, whereby reproduction or recording is to be performed.

And, when dismounting and exchanging the disk D, first the eject button is pressed.

Then, the carrying member holds the disk D first, and the motor 17 rotates in the opposite direction to the above-mentioned direction to rotate the drive gear 7 clockwise.

This rotation turns the clamp lever 4, whereby the arms 5b of the holding arm 5 start to creep in the lower part of the flange 2c of the clamper 2, and the slant parts 5c that are slant against the face of the disk D creep in the lower part to lift up the clamper 2 and also press the clamping part 2a to the support member 1, thus returning to the original state shown in FIG. 2 through FIG. 5.

Also, this turn of the clamp lever 4 slides the slide member 16 backward, accordingly the pin 15 moves from the upper groove 16a toward the lower groove 16b, and accompanied with this movement, the turntable 14 moves downward through the drive plate 13, thus returning to the original state, namely the non-clamped state of the disk D as shown in FIG. 2 and FIG. 3.

Further, the switch lever 10 returns to the original state, and the switch 9b comes in the operated state, namely, the state of the non-clamped state of the disk D being detected.

The disk D is to be carried back to the disk package P by the carrying member.

Thus, the disk D is clamped or released from being clamped.

Since the clamp mechanism for a disk drive of the present invention is designed to lift up the clamper 2 by the holding arm 5 during the non-clamped state of the disk D, and to maintain the lifted-up state of the clamper 2, it can provide a clamp mechanism without creating displacement of the clamper 2 owing to vibrations, shocks, etc., of the disk drive.

Since the clamp mechanism is made to press the clamping part 2a of the clamper 2 to the support member 1 by the holding arm 5 raising the flange part 2c of the clamper 2, it is able to reliably prevent the displacement of clamper 2, and to provide a clamp mechanism with a simplified construction, low production cost, and good productivity.

Also, it can provide a clamp mechanism with a simplified construction and low production cost, since the slant parts 5c are furnished with the holding arm 5 and the flange part 2c is made to be raised by the slant parts 5c.

Further, the holding arm 5 is placed to be swingable in the transverse direction against the moving direction of the clamper 2, and thereby the holding arm 5 can be placed and fixed in flat; therefore, it can provide a thin clamp mechanism.

Furthermore, since the holding arm 5 is integrated with the clamp lever 4, it can provide a clamp mechanism which reduces the number of the components, with a small size, low production cost, and good productivity.

What is claimed is:

1. A clamp mechanism for a disk drive comprising a turntable disposed so as to be vertically movable, a clamper facing said turntable, said clamper being mounted on a support member so as to be movable in a direction towards or away from said turntable, and a holding arm that can be engaged with and released from said clamper, wherein said turntable and said clamper are made to be attracted to each other by a magnetic force, wherein said clamper is movably disposed through an opening in said support member, said clamper being provided with a clamping part that underlies said support member and a flange part that overlies said support member, wherein said holding arm is provided with a slanted part that is slanted upwardly, said slanted part being configured to engage said flange member so as to raise said clamper into a lifted-up state when said holding arm is engaged with said clamper, said clamping part being pressed against said support member when said clamper is in the lifted-up state, and wherein said holding arm releases said clamper from the lifted-up state when said turntable is raised, a disk is clamped between said turntable and said clamper by the magnetic force, the disk is released from being clamped when said turntable is lowered, and said holding arm lifts up said clamper to maintain the lifted-up state of said clamper.

2. The clamp mechanism for a disk drive according to claim 1, wherein said holding arm is placed to be swingable in a transverse direction against a moving direction of said clamper.

3. The clamp mechanism for a disk drive according to claim 1, further comprising a drive gear turned by a motor, and a clamp lever turned by said drive gear which is associated with lifting movement of said turntable, wherein said clamp lever is formed integrally with said holding arm.

4. The clamp mechanism for a disk drive according to claim 1, wherein a suspending part is attached to an end of said slanted part, said suspending part being configured to engage a lower surface of said flange member, the lower surface of said flange member being disposed so as to face an upper surface of said support member.

5. The clamp mechanism for a disk drive according to claim 4, wherein the lower surface of said flange member is spaced away from the upper surface of said support member when said clamper is in the lifted-up state.

6. The clamp mechanism for a disk drive according to claim 5, wherein the lower surface of said flange member is disposed against the upper surface of said support member when said clamper is released from the lifted-up state.

* * * * *